United States Patent
Schmidt-Uhlig

(10) Patent No.: US 9,208,816 B2
(45) Date of Patent: Dec. 8, 2015

(54) METHOD, APPARATUS, AND RECORDING MEDIUM FOR RECORDING MULTIMEDIA CONTENT

(75) Inventor: Thomas Schmidt-Uhlig, Gleichen (DE)

(73) Assignee: Thomson Licensing, LLC, Boulogne-Billancourt (FR)

( * ) Notice: Subject to any disclaimer, the term of this patent is extended or adjusted under 35 U.S.C. 154(b) by 2291 days.

(21) Appl. No.: 11/801,360

(22) Filed: May 9, 2007

(65) Prior Publication Data

US 2007/0269185 A1  Nov. 22, 2007

(30) Foreign Application Priority Data

May 22, 2006  (EP) .................................... 06114310

(51) Int. Cl.
*H04N 9/80* (2006.01)
*G11B 20/00* (2006.01)
*G11B 27/32* (2006.01)

(52) U.S. Cl.
CPC ...... *G11B 20/00724* (2013.01); *G11B 20/0084* (2013.01); *G11B 20/00086* (2013.01); *G11B 20/00159* (2013.01); *G11B 20/00702* (2013.01); *G11B 27/322* (2013.01)

(58) Field of Classification Search
CPC ..................... G11B 20/0724; G11B 20/00086; G11B 20/00159; G11B 20/00702; G11B 20/0084; G11B 20/322
USPC .................. 386/238, 291, 248, 261, 257–259
See application file for complete search history.

(56) References Cited

U.S. PATENT DOCUMENTS

| | | | |
|---|---|---|---|
| 4,930,158 A | | 5/1990 | Vogel |
| 5,691,972 A | * | 11/1997 | Tsuga et al. ................ 369/275.3 |
| 6,347,183 B1 | * | 2/2002 | Park ............................... 386/261 |
| 6,434,535 B1 | * | 8/2002 | Kupka et al. .................... 705/24 |
| 6,519,412 B1 | | 2/2003 | Kim |
| 6,847,777 B1 | * | 1/2005 | Nakamura ............... H04N 5/85 386/234 |
| 7,631,361 B2 | * | 12/2009 | Yamamichi et al. ............ 726/27 |
| 7,712,115 B2 | * | 5/2010 | Van Horck ............ H04H 60/48 386/252 |
| 8,391,677 B2 | * | 3/2013 | Okada et al. .................. 386/261 |
| 2002/0133708 A1 | * | 9/2002 | Gudorf .................... G06F 21/33 713/186 |
| 2003/0126596 A1 | | 7/2003 | Kim |
| 2004/0042760 A1 | * | 3/2004 | Jeong ............................. 386/46 |

(Continued)

FOREIGN PATENT DOCUMENTS

| | | |
|---|---|---|
| EP | 0 810 603 A1 | 8/2004 |
| EP | 1455359 | 9/2004 |

(Continued)

OTHER PUBLICATIONS

European Search Report Sep. 29, 2006.

*Primary Examiner* — Helen Shibru
(74) *Attorney, Agent, or Firm* — International IP LawGroup, PLLC

(57) ABSTRACT

The invention relates to a method, an apparatus, and a recording medium for recording multimedia content, which allow a controlled access to the multimedia content. According to the invention, the recording medium for recording multimedia content has a content limitation indicator for indicating which multimedia content is allowed to be recorded on the recording medium, which specifies an age rating for the multimedia content. A recording apparatus compares the multimedia content to be recorded with the limitations specified by the content limitation indicator prior to recording the multimedia content on the recording medium.

10 Claims, 2 Drawing Sheets

(56) References Cited

U.S. PATENT DOCUMENTS

| | | |
|---|---|---|
| 2004/0064377 A1 | 4/2004 | Ergo et al. |
| 2004/0158871 A1 | 8/2004 | Jacobsen |
| 2004/0205155 A1* | 10/2004 | Nobakht .......... H04L 29/12009 709/217 |
| 2004/0220926 A1* | 11/2004 | Lamkin ............. G06F 17/30017 1/1 |
| 2004/0267669 A1 | 12/2004 | Gross |
| 2007/0118857 A1* | 5/2007 | Chen et al. ....................... 725/61 |
| 2007/0124603 A1* | 5/2007 | Yamamichi et al. ........... 713/194 |
| 2008/0145025 A1* | 6/2008 | Wimberly et al. .............. 386/95 |

FOREIGN PATENT DOCUMENTS

| | | |
|---|---|---|
| GB | 2346251 | 8/2000 |
| JP | 11232177 | 8/1999 |
| JP | 2002092517 | 3/2002 |
| JP | 2003123268 | 4/2003 |
| JP | 2004030779 | 1/2004 |
| JP | 2005100253 | 4/2005 |
| JP | 2005108362 | 4/2005 |
| WO | WO2004029836 | 4/2000 |
| WO | WO0040027 | 7/2000 |
| WO | WO 2005/020540 A1 | 3/2005 |

* cited by examiner

METHOD, APPARATUS, AND RECORDING MEDIUM FOR RECORDING MULTIMEDIA CONTENT

This application claims the benefit, under 35 U.S.C. §119 of European Patent Application 06114310.3, filed May 22, 2006.

FIELD OF THE INVENTION

The invention relates to a method, an apparatus, and a recording medium for recording multimedia content, and more specifically to a method, an apparatus, and a recording medium allowing controlled access to multimedia content.

BACKGROUND OF THE INVENTION

A plurality of such methods, apparatuses, and recording media, especially for renting or selling movies, audio files, or games, are known. For example, US 2004/0158871 discloses a Kiosk machine that allows customers to browse a title database, view title descriptions, and then have a copy of the titles saved to a DVD disk. Payment is effected via credit card. The customer can either purchase or rent the titles. The kiosk verifies the customer's age for compliance with age restrictions of the selected titles. For this purpose data on the customer's credit card or driver's license is read. As an alternative, an attendant may verify the age and provide a code that permits to access the selected titles. A drawback of this approach is that a plurality of recordable DVDs need to be stored in the Kiosk, which increases the size of the Kiosk. In addition, the renting or purchasing operation cannot be performed anonymously, as the user needs to give credit card information for payment.

In order to allow an anonymous renting or purchasing operation, and to circumvent the storage of recording media in the kiosk, it has been proposed to use prepaid recording media for payment of multimedia content. The recording media are bought in advance, e.g. in video stores etc., and have a certain value, which is then used for payment at the time of recording the multimedia content. As the purchase of the prepaid recording medium and the recording operation may take place at completely different times and different locations, the customer remains anonymous when recording the multimedia content. However, in case an age verification is needed to control access to specific multimedia content, at the time of the recording operation an identity card has to be provided. This means that the anonymity of the customer is no longer ensured.

SUMMARY OF THE INVENTION

It is an object of the present invention to propose a solution for recording multimedia content enabling controlled access to the multimedia content.

According to the invention, this object is achieved by a recording medium for recording multimedia content, with an indicator for indicating which multimedia content is allowed to be recorded on the recording medium, which specifies an age rating for the multimedia content. The indicator on the recording medium specifies multimedia content limitations, i.e. it allows to control which multimedia content is approved for recording on the recording medium. The solution according to the invention allows to restrict or enable access to multimedia content solely based on the recording medium on which the multimedia content is to be recorded. No user identification is necessary. Consequently, no means for identifying the user, e.g. an identity or credit card reader is needed. At the time of purchasing the recording medium the customer's age is verified. The recording medium indicates this age, e.g. in the form of the date of birth, or by simply specifying an age rating such as 'rated up to 16 years'. In this way it is ensured that no inappropriate multimedia content can be recorded on the recording medium.

In addition to the age rating the indicator may also indicate other limitations related to a property of the multimedia content. The property advantageously is at least one of a producer, a release date, a producing studio, an actor, a genre, and an inclusion in a promotion campaign. These properties are especially useful if the indicator is used for promotional purposes. For example, a movie producing studio may distribute recording media which allow to record for free all movies produced by the studio having a release date at least five years ago.

Advantageously, the indicator can be modified. In the case of an age restriction, for example, the restriction can be lowered or raised. This would allow an adult to adjust the age restriction to the age of his children. The possibility to modify the indicator is advantageously protected by a password.

Preferably, the recording medium has different indicators for different users. The different indicators may be, for example, different age restrictions for different family members. Each indicator is preferably associated with a specific password. Upon entering a password the corresponding indicator is identified and used.

In the case of age restrictions, advantageously each user has the possibility to modify his age restriction. However, the age restriction may not be raised over its initial value, which is preferably also recorded on the recording medium. Optionally one user may have the status of a master user, which can modify the restrictions for all users and add new users.

A method according to the invention for recording multimedia content on a recording medium has the steps of:
  comparing the multimedia content to be recorded with a content limitation indicator on the recording medium, which specifies an age rating for the multimedia content; and
  recording the multimedia content on the recording medium in case the multimedia content fulfills the limitations specified by the content limitation indicator.

For implementing a method according to the invention, an apparatus for recording multimedia content on a recording medium has:
  a verification unit for comparing the multimedia content to be recorded with a content limitation indicator on the recording medium, which specifies an age rating for the multimedia content; and
  a recording device for recording the multimedia content on the recording medium.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

In the following the invention is explained for a method for renting a movie on a DVD. Of course, the invention is not limited to this example. The invention is likewise applicable to other types of multimedia content, such as music, software, games, pictures, text, or other types of data. Similarly, recording can also be performed on other types of recording media, e.g. other types of optical disks (Compact Disk, BluRay Disk, High Density Digital Versatile Disk, Holographic Disk or Card, etc.), tapes, storage cards, etc.

Figure 1:
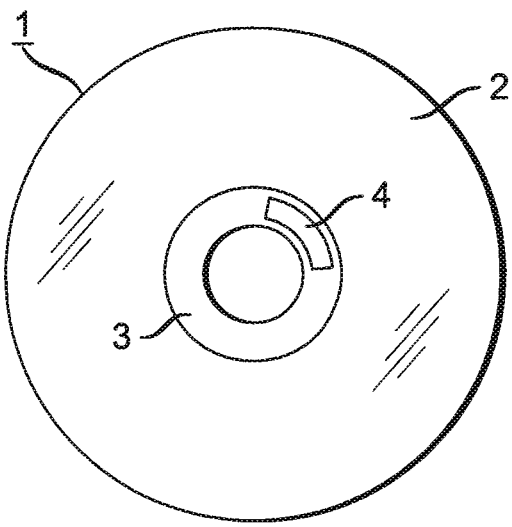
FIG. 1 shows an optical recording medium according to the invention.

In FIG. 1 an optical recording medium 1 according to the invention is shown. The recording medium 1 has a data recording area 2 and a special area 3 for a content limitation indicator 4. In the figure the special area 3 is illustrated as an area distinct from the data recording area 2. However, the indicator 4 may likewise be recorded in the data recording area 2.

Figure 2:
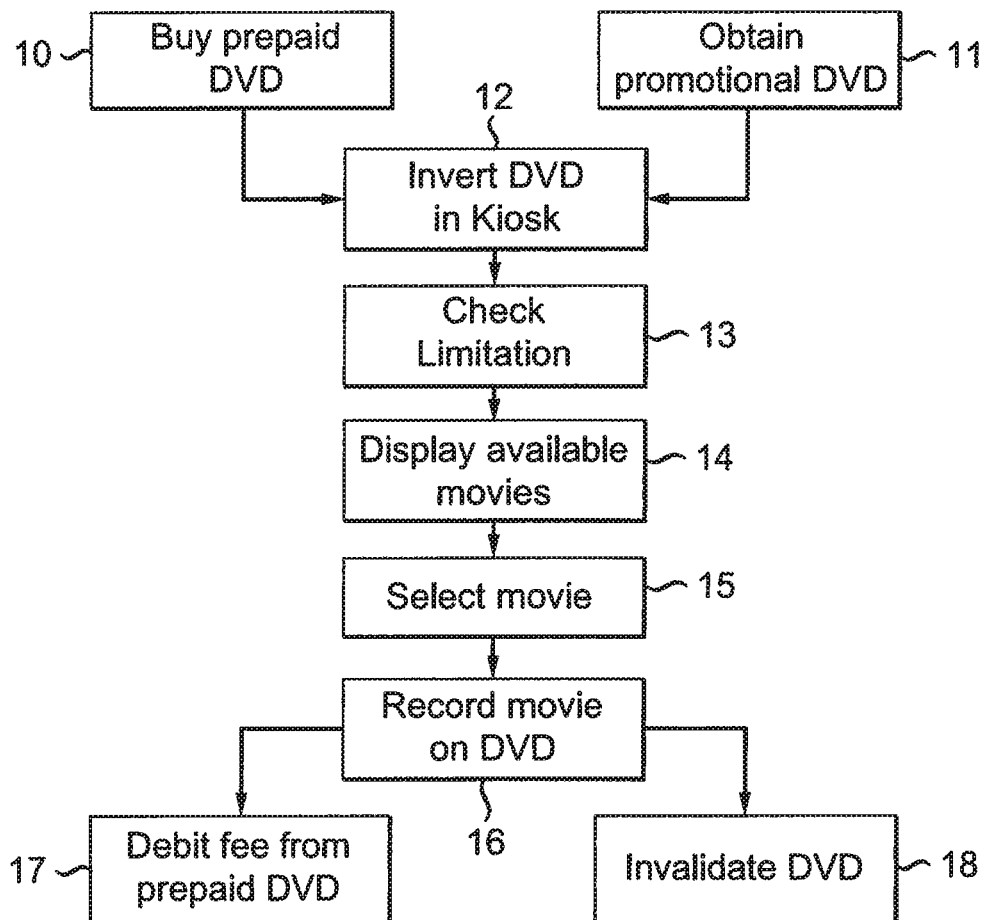
FIG. 2 illustrates a method according to the invention for recording movies.

FIG. 2 illustrates a method according to the invention for renting movies. A customer who wants to rent a movie first buys 10 a prepaid, recordable or rewritable DVD. This DVD can preferably be purchased at a plurality of locations, e.g. at gas stations, supermarkets or convenience stores, diners, bus or trains stations etc. At the time of purchase, the customer is asked for an identification document to verify his age. According to one solution, the customer then receives a DVD indicating that movies rated 6, 12, 14, 16 or 18 years, by way of example, are allowed to be recorded. This indication is fixed, which has the advantage that it cannot easily be hacked. In this case, however, different types of DVDs have to be provided. According to a further solution, the DVD indicates the date of birth of the owner. This indication is recorded on the DVD using special equipment. Preferably, the indication is secured to prevent illegal alterations of the indication. In this case only one type of DVD is needed.

The prepaid DVD either has a fixed initial value or is loaded with a variable amount. The amount is recorded on the DVD and is preferably protected. It may be indicated as a monetary value (e.g. EUR or USD), a proprietary value ("movie points", etc.), the number of rentable movies, or the like.

According to a further aspect of the invention, instead of obtaining 10 a prepaid recordable DVD with an age indication, a customer may be provided 11 with a recordable DVD having a different indication. For example, a video distributor or a studio distributes recordable DVDs for promotional purposes. An indicator on the DVD specifies which movies may be recorded on the DVD, e.g. only movies produced by a specific studio, movies with a release date before a specified date, movies belonging to special promotion campaign, etc.

When the customer intends to rent a movie, he inserts 12 the prepaid or promotional DVD in a recording apparatus of a renting terminal (kiosk). The renting terminal verifies 13 the age of the customer using the indicator on the DVD and/or checks for other content limitations indicated on the DVD. A list of available movies is then automatically limited 14 to titles complying to the age and/or the other limitations. The customer can then select 15 a movie (or a plurality of movies) from the list of available movies. After selecting 15 a movie, the movie is recorded 16 to the recordable DVD. In case of a normal prepaid DVD, after recording 16 the movie the corresponding fee is debited 17 from the prepaid DVD. In case of a promotional DVD, the DVD may be invalidated 18 to prevent further recording.

Figure 3:
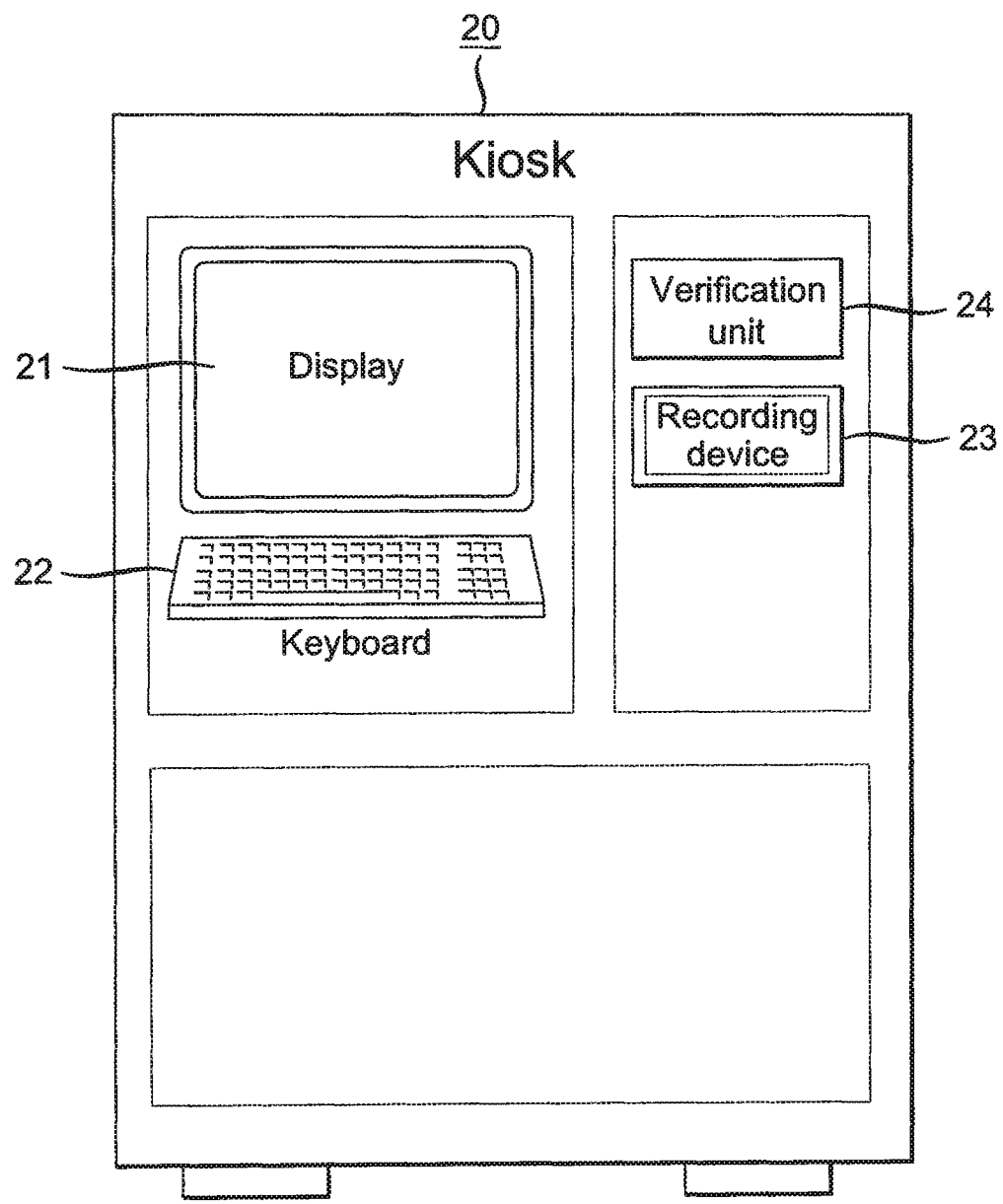
FIG. 3 schematically shows a DVD kiosk implementing a method according to the invention.

In FIG. 3 a DVD kiosk 20 implementing a method according to the invention is shown schematically. The kiosk 20 has a display 21 and a keyboard 22 for interaction with a customer. Of course, other types of user interface can also be employed, e.g. a touch screen etc. The customer inserts the prepaid or promotional, recordable or rewritable DVD into a recording device 23 of the kiosk 20. Preferably, the recording device 23 uses a slot loading mechanism, which reduces the risk of damage. However, the recording device 23 can also use a tray for receiving the DVD. The kiosk further includes a verification unit 24 for verifying the customer's age and/or other content limitations based on the indicator on the DVD. After verification a list of available movies is displayed. The list may already be limited based on the content limitations, or at least indicates which of the displayed movies may be recorded. Using the keyboard 22 the user selects one or more of the movies, which are then recorded on the DVD by the recording device 23.

Though in the above the invention has been described for a multimedia content distribution system based on prepaid media, the invention is not limited to such a renting system. It can also be implemented with usual recording media. In this case the age indication is especially advantageous. Minors would only be allowed to purchase recording media in accordance with their age. Inappropriate content could not be recorded on those recording media, e.g. using a DVD recorder in a PC or a stand-alone DVD-Recorder for recording TV-signals.

What is claimed, is:

1. A method for recording a multimedia content item, on a non-transitory, removable recording medium, the method comprising:
   retrieving a content limitation indicator specifying an age rating from the non-transitory, removable recording medium;
   retrieving an age rating associated with the multimedia content item;
   comparing the retrieved age rating associated with the multimedia content item with the retrieved content limitation indicator on the non-transitory, removable recording medium; and
   recording the multimedia content item on the non-transitory, removable recording medium if the retrieved age rating associated with the multimedia content item fulfills limitations specified by the content limitation indicator.

2. An apparatus for recording a multimedia content item on a non-transitory, removable recording medium, having:
   a verification unit configured:
      to retrieve a content limitation indicator specifying an age rating from the non-transitory, removable recording medium;
      to retrieve an age rating associated with the multimedia content item; and
      to compare the retrieved age rating associated with the multimedia content item with the retrieved content limitation indicator; and
   a recording device configured to record the multimedia content item on the non-transitory, removable recording medium if the retrieved age rating associated with the multimedia content item fulfills limitations specified by the content limitation indicator.

3. The method of claim 1, comprising modifying the content limitation indicator.

4. The method of claim 3, wherein the content limitation indicator is protected by a password.

5. The method of claim 1, wherein the non-transitory removable recording medium comprises different content limitation indicators for different users.

6. The method of claim 1, wherein the non-transitory removable recording medium is an optical recording medium.

7. The apparatus of claim 2, comprising a user interface congigured to modify the content limitation indicator.

8. The apparatus of claim 7, wherein the content limitation indicator is protected by a password.

9. The apparatus of claim 2, wherein the non-transitory removable recording medium comprises different content limitation indicators for different users.

10. The apparatus according to claim 2, wherein the non-transitory removable recording medium is an optical recording medium.

* * * * *